United States Patent [19]

Rosenblum

[11] 3,728,014
[45] Apr. 17, 1973

[54] APPARATUS FOR PROJECTING A SCENE

[75] Inventor: William M. Rosenblum, Winchester, Mass.

[73] Assignee: Polaroid Corporation, Cambridge, Mass.

[22] Filed: May 24, 1971

[21] Appl. No.: 146,553

Related U.S. Application Data

[63] Continuation of Ser. No. 761,044, Sept. 20, 1968, abandoned.

[52] U.S. Cl. ................................................353/38
[51] Int. Cl. ............................................G03b 21/14
[58] Field of Search........................353/30, 38, 32; 350/160, 168

[56] References Cited

UNITED STATES PATENTS

| 3,045,531 | 7/1962 | Prescott | 350/162 SP |
| 992,151 | 5/1911 | Berthon | 352/66 |
| 1,836,787 | 12/1931 | Berthon | 353/32 X |
| 1,989,553 | 1/1935 | Kanolt | 352/66 |
| 2,451,164 | 10/1948 | Grimson | 355/33 X |
| 2,985,866 | 5/1961 | Norton | 350/162 |
| 3,095,475 | 6/1963 | Brake | 350/162 X |

OTHER PUBLICATIONS

Pub: "Diffraction by a Finite Sinusoidal Grating" Barrekette & Freitag IBM Journal Vol. 7 No. 4 Oct. 1963

Primary Examiner—Harry N. Haroian
Attorney—Brown and Mikulka

[57] ABSTRACT

A system and apparatus for projecting scenes upon color additive film. This film is typically configured having a filter screen portion overlaying an image carrying base. The filter screen may be formed as an array of parallel color stripes laid down in a repetitive sequence of colors such as the primaries red, green and blue. A diffraction grating of a phase variety is inserted in the optical path of a projector to cause the projection of zero and first order images of a scene recorded upon the film. The diffraction grating incorporates a surface which is sinusoidal in cross section and is designed so as to cause a replication and mutual displacement of a film image resulting in a blending of the components thereof at a display surface.

6 Claims, 7 Drawing Figures

PATENTED APR 17 1973 3,728,014

INVENTOR
William M. Rosenblum

BY Brown and Mikulka
and
Gerald L. Smith
ATTORNEYS

PATENTED APR 17 1973 3,728,014

INVENTOR.
William M. Rosenblum
BY
Brown and Mikulka
and
Gerald L. Smith
ATTORNEYS

APPARATUS FOR PROJECTING A SCENE

This application is a continuation of application Ser. No. 761,044, 9/20/68, now abandoned.

The present invention relates to the projectional display of scenes recorded upon photographic film, and more particularly, to a phased diffraction grating arrangement for use in projecting scenes which have been recorded upon film as an array of selectively colored image components which appear as additively synthesized to form a full color image of a scene when viewed at a distance.

BACKGROUND OF THE INVENTION

Film structures designed for recording full color images of scenes in accordance with the additive color theory traditionally are configured such that the recorded image is present as an array of adjacent and discrete components. Each of these image components is formed to represent a select color aspect of the photographed scene. When the entire scene image is viewed at a distance, the eye combines the components forming the image and, as a consequence, a substantially full color reproduction is witnessed.

The image components of the film structures are formed having a regular geometric shape, generally taking form of parallel stripes which extend across the image area of a film frame. Being of macroscopic width, each of the stripes or components functions to represent one chrominance aspect of a minute portion of an image. The color components are arranged in a manner providing a serially repetitive sequence of selected additive colors, such as the primaries red, blue and green.

Film structures utilizing the color additive system advantageously may be produced in any of a wide variety of configurations. For the most part, they take a laminar form basically including a filter layer sometimes referred to as a screen which incorporates the color stripes. This screen is deposited upon or formed with a photosensitive image carrying layer. By initially exposing the photosensitive layer through the color stripe carrying screen, a color coded composite image is derived. When light is projected through both the developed image layer and screen, the resultant scene or whole image will appear as a full color representation.

In addition to the desirable latitude enjoyed with the fabrication of a laminar film form, the additive film structure also permits the manufacture of a wide diversity of color film types. Inasmuch as the image carrying layer of the film format records only a relative input of light passing through the filter screen, it may be structured similarly to conventional black and white film. As a result, the wide latitudes in light sensitivity or film speed and chemical makeup present in black and white film structures are made available for color image reproduction. The laminar color additive film form enjoys particular advantage where the design of instant processing color film is contemplated. With its use, the broadly ranging instant processing techniques heretofore utilized with black and white transparencies are readily adapted to the task of developing full color scenes.

When displayed at conventional projection distances, additive color film transparencies will provide accurate color scene reproductions. As these scenes are displayed at relatively high magnification, however, the color stripes of the screen may become separately identifiable to an observer. Additionally, the magnified image derived from the projection of a film format utilizing a screen having parallel color stripes may also be observed to have a discernible pattern of fine dark lines. The thin lines forming this pattern usually represent a minute overlap of the edges of contiguous color stripes of the film structure. In most instances, the lines are the product of high volume manufacturing practices.

Both the dark line and the color stripe patterns may be diminished by causing a minor blend or meld of the projected images of contiguous stripes. For instance, a shift creating a selected overlap of adjacent screen stripe images at a display surface will cause a substantial disappearance of the patterns while maintaining an acceptably clear and desirable image projection. To provide for such a minute adjustment of projected images, however, somewhat precise instrumentation has been required. Where introduction to a high volume consumer market is contemplated, such instrumentation should be easily fabricable so as to be available to the consuming public at relatively low unit costs.

The instrumentation additionally should be capable of accommodating for design variations in the color contents of the stripes or color components within the film screen. To achieve a more desirable color balance within a recorded scene, the filter components within a screen are often dimensioned so as to emphasize the contribution of one or more of the primary colors. For instance, such a balance may be effected by varying the widths of the stripes carrying the primary colors. Where image blending techniques are utilized with magnified image projection, such a designed color balance may be adversely affected at the projectional display surface. Color balance disruption of the projected image is often encountered where one or more of the offset blending images is present at a display surface at a somewhat altered light energy intensity.

SUMMARY OF THE INVENTION

The present invention provides a projection system and apparatus for displaying scenes recorded upon color film according to the color additive technique. The projection arrangement advantageously diminishes any identifiable color stripe or dark line pattern which may otherwise be encountered at a display surface when magnifying such scene images. In diminishing the projected patterns, the inventive arrangement functions to cause a blend or meld of multiple images of the recorded scene at an image plane.

A principal feature of the invention lies in the provision of a diffraction grating of a sinusoidal phase variety which functions to derive the multiple images required for creating an overlay of the color components projected at an image plane.

Positioned within the optical path of a projector lens system, the sinusoidal diffraction phase grating functions to impose a Fraunhofer form of diffraction upon the color film image transmitted through it. As a result, a plurality of scene images displaced along a singular projection axis are produced, each representing an order of diffraction. These overlapping images provide a color additive blend or meld of the otherwise identifiable color component images present at a projection display surface.

By virtue of the overlapping of adjacent color component images formed as parallel stripes, the diffraction arrangement advantageously causes a lightening of the dark lines otherwise forming a geometric pattern at a display surface. As a result, this pattern is caused to substantially disappear.

The invention is further characterized in utilizing a diffraction grating of the transmission sinusoidal phase variety to cause the production of zero and first order images of a recorded scene which are mutually displaced at an image plane by predeterminable distances. The magnitude of this displacement may be selected in accordance with the configuration of the grating. Another advantageous feature of the sinusoidally configured grating lies in the control of relative light intensities of these zero and first order images. As a result of this intensity control, the color balance initially designed in the additive color film format may be accurately maintained while deriving an image blend at a display surface.

A further object of the invention is to provide a correcting diffraction grating arrangement of the type described which will function effectively when used with either motion picture or stationary film projection devices.

An additional object of the invention is to provide a projection system incorporating a fully transmissive sinusoidal phase grating for use in supplementing the projection of images derived from color additive film, wherein the grating is configured to adjust the relative intensities of the zero and first order images of all color components of the film so as to substantially maintain at a projection image plane the color balance present within the image recorded on the film.

It is a further object of the invention to provide a projection system for use with color additive film which incorporates an image blending attachment in the form of a fully transmissive sinusoidal phase grating. The phase grating is insertable within the optical path of the lens system of a projector, and its sinusoidal configuration is selected such that the spacing and relative intensities of each order of the images projected at an image plane will be governed by the sinusoidal function incorporated within the phase gratings and by the wavelengths of the color components projected therethrough.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiments when read in connection with the accompanying drawings wherein:

DETAILED DESCRIPTION OF THE DRAWINGS

Figure 1:
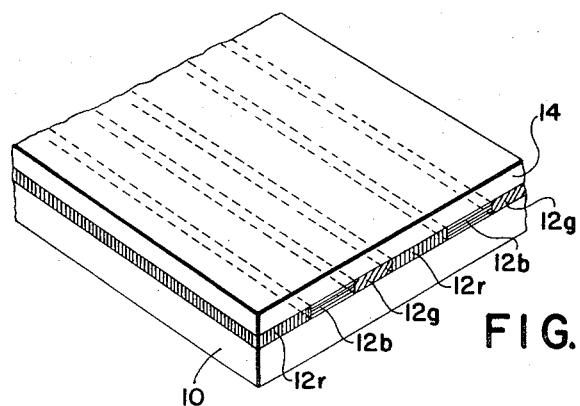
FIG. 1 is a perspective view of a fragment of color additive film in exaggerated scale.

The film structures for which the present projection system is intended are configured so as to present a recorded scene as an array of somewhat discrete image components. Referring to FIG. 1, a typical additive color film format is illustrated. The film structure is shown to comprise a transparent base 10 upon which is deposited a screen or filter. The screen is depicted at 12 as a sequence of parallel stripes each representing a preselected primary color. These colors are identified by the subscripts $r$, $b$ and $g$ to indicate, respectively, the primaries red, blue and green. The laminar structure also includes a photosensitive image carrying layer 14 which is exposed through the filter layer 12. Layer 14 generally comprises a photosensitive emulsion similar to any of those utilized with conventional black and white films. It will be apparent that the positions of any of the described layers within the laminar structure may be varied to suit any of a variety of photographic requirements. Depending upon the particular additive color system used in the film structure, the primary colors within the screen layer 12 may be reduced, for instance, to two or increased to more than the three illustrated in the drawing. To form a desired color balance within a film structure such as that illustrated, the relative widths of the color component stripes layer 12 extending across a film frame may be varied. For instance, in a three color screen structure such as that depicted, the red stripes are typically formed of wider dimension and are, therefore, more predominant than the other color components.

When projected at higher magnifications, these stripes become visibly identifiable at a projection display surface and tend to detract from the quality of the whole image perceived. The blending arrangement of the invention functions to cause a simultaneous projection of a plurality of images through each film frame. These images are displaced uniaxially by very minor and predetermined distances in a manner forming an overlapped composite image at the display surface. The multiplication and displacement of the projected images are derived by a sinusoidal phase grating interposed within the optical path of the lens system of a projector. These phase gratings are fully transparent but vary from point to point in optical thickness, either through variation of refractive index, variation of geometrical thickness, or both. Their effect is to impress variations in phase on the complex amplitude of incident light. It has been found that when such a phase grating is inserted within the optical path of a projector near its lens system, a form of Fraunhofer diffraction arises to create a plurality of mutually displaced images of the original recorded scene. These images may be categorized as representing a zero order, primary order, secondary order, and so on, in accordance with conventional grating theory.

Figure 2:
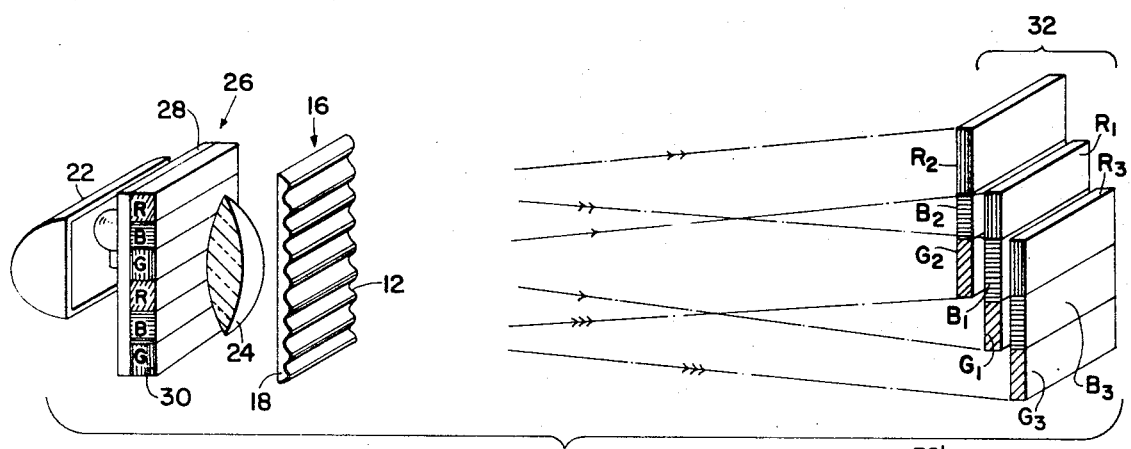
FIG. 2 is a schematic and partially sectional portrayal of a projection system according to the invention, showing an idealized projection of a scene through a transmission sinusoidal phase grating in accordance with the preferred embodiment of the invention.

Referring to FIG. 2, the blending function of a sinusoidal phase grating within a projection system is illustrated. The sinusoidal phase grating is pictured in exaggerated scale at 16 and includes a plano base surface 18 over which is imposed a relief surface of sinusoidal cross section 20. A phase grating 16 is positioned in the optical path of a projection system which includes a light source 22 and a projection lens 24. A fragment of color additive film is illustrated in greatly exaggerated scale at 26 in position to intercept light emanating from the light source. Film 26 is depicted having a simplified structure including a combined image carrying layer and supportive base 28 over which is formed a screen 30. Screen 30 is fashioned of parallel color stripes in the recurring sequence of primaries red, blue and green. These stripes are identified respectively by the letters R, B and G. Note that the parallel contours of the sinusoidal surface of grating 16 are arranged in parallel with the lengthwise stripe orientation of the screen 30. The phase grating 16 is configured having a select frequency ($f$) representing the number of cross sectional sinusoidal cycles per unit length disposed along its surface. This frequency is selected such that the grating will generate a Fraunhofer form of diffraction at an image plane, shown in expanded fashion for clarity, at 32. The Fraunhofer diffraction will form a zero order image at the center of the image plane 32 as depicted by the three magnified image stripes $R_1$, $B_1$ and $G_1$. Single arrow lead lines schematically represent the projection of such a zero order image. Grating 16 will also produce a plurality of diffraction images, depending upon its particular design. Generally it is desirable that only the primary or first orders of these diffraction images be visible at the image plane or display surface 32. The first orders of screen fragment image $R_1$-$G_1$-$B_1$ are depicted in the expanded image plane 32 by stripes $R_2$-$G_2$-$B_2$ within the double arrow lead lines and on the opposite side of the zero order image as stripes $R_3$-$G_3$-$B_3$ within the triple arrow lead lines. The primary order images are displaced from the zero order images by amounts sufficient to form a desirable meld of the projected color components or stripes of the film structure. Grating 16 may be designed so as to cause a primary order spacing adequate for causing the additive overlay of adjacent color stripes. The amount of displacement of each first order image from the zero order image is selected with respect to and in correspondence with the color component dimensions within film screen 30. This image displacement for a first order has been derived as the product $f\lambda Z$ where $f$ is the frequency of the grating, $\lambda$ is the wavelength of a select light frequency, and Z is the distance from the diffraction grating to the image plane.

In addition to a control over image order spacing, a control of the relative light intensities of each of these orders is also highly desirable. To maintain an adequate color balance while providing a proper blending function at the image plane, it is generally necessary to effect a control of the relative light intensities of first order images formed at the wavelengths represented by the color components or stripes as at screen 30. The sinusoidal form of phase grating ideally offers the dual capacity of image intensity control and first order image spacing control.

Figure 3:
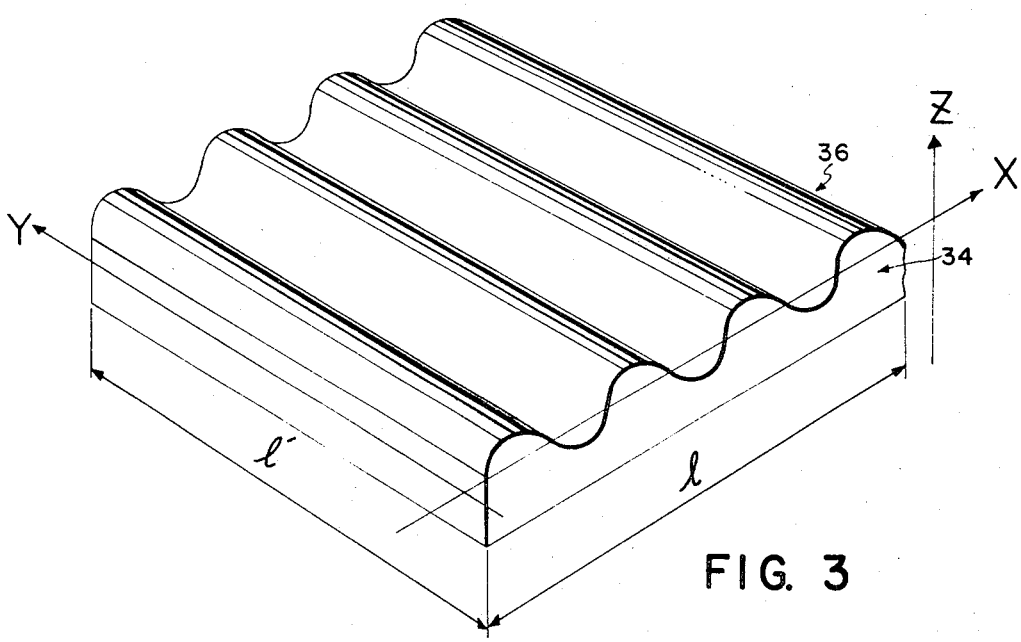
FIG. 3 is a perspective view of a sinusoidal phase grating showing the orientation of orthogonal axes used in the derivation of its design.

Referring to FIG. 3, an exemplary grating is illustrated generally incorporating a plano base portion 34 upon which is imposed a relief structure of sinusoidal cross section at 36. In the discussion to follow, the exemplary phase grating will be considered to have a dimension $l$ along the X axis shown and a dimension $l'$ along the Y axis. A Z axis is shown erected normally to the plane of the X—Y axes. Light transmitted through this structure will produce at an image plane a series of multiordered images. The spacing and relative intensities of each order of the images projected at a display surface or image plane will be governed by the sinusoidal function of the phase grating contour 36 and the wavelengths of light transmitted through it. This effect can be predicted under the following theoretical considerations.

The multiplicity of images formed by light diffraction through the grating can be described in terms of a transmission function $t(x,y)$. This function may be considered as the following expression:

$$t(x,y) = e^{(im/2)\sin(2\pi f x)} \operatorname{rect}(x/l) \operatorname{rect}(Y/l') \quad (I)$$

where $m$ represents maximum range alteration of the phase of light progressing through the grating, $l$ represents one dimension of a phase grating, and $l'$ represents the dimension of the grating along an opposite axis as depicted in FIG. 3. The expression shown in equation (I) is seen to utilize rectilinear functions.

A grating configured in accordance with the expression at (I) will evolve a corresponding intensity pattern in an image plane parallel to that represented by the X,Y axes of the grating and positioned a distance from the grating identified as z. This image plane is the display surface of a projection system according to the invention. The corresponding intensity pattern in the image plane may be represented by the following expression:

$$I(x_0,y_0) = \left[\frac{ll'}{\lambda z}\right]^2 \sum_{q=-\alpha}^{\alpha} J_q^2\left(\frac{m}{2}\right) \operatorname{sin} c^2\left[\frac{l}{\lambda z}(x_0 - qf\lambda z)\right] \operatorname{sin} c^2\left(\frac{l'y_0}{\lambda z}\right)$$

(II)

where $J_q$ is a Bessel function of the first kind of order $q$; $\lambda$ is the wavelength from any select light region; $f$ is the frequency of the grating or the reciprocal of the period of the sinusoidal function of the grating; and the sinc function will be recognized as the sine of some function of $x$ divided by that function of $x$. The terms $x_0$ and $y_0$ are used in expression (II) to indicate the orthogonal axes in the image plane which are parallel to the corresonding X and Y axes in the grating. The intensity function represented at equation (II) will be recognized as a series of the squares of Bessel functions times respective sinc functions which, in turn, represent the manner in which the intensity of each image order varies along the $x_0$ and $y_0$ axes.

The peak intensity of any image order $q$ located a distance $qf\lambda z$ from the zero order is given by the expression:

$$I_q = ll' J_q(m/2)^2/z \qquad (III)$$

By selecting appropriate parameters for insertion in the expression (II), a phase sinusoidal grating may be designed which will accommodate any particular color balance and blending arrangement. It may be noted that an adjustment of the physical parameters of the grating will follow an alteration of the parameters: $(f)$ and $(m)$. Note that one of these expressions will be present for any given grating for each value of $\lambda$. An analysis of the expressions (I) through (III) has shown that under a phase shift of approximately 140°, it is possible to produce first and zero order images having identical intensities for any given light wavelength $\lambda$, the two primary orders being displaced from their zero order by a distance $\pm f\lambda Z$. It may be observed, therefore, that a somewhat complete control over the design requirements of the projection system may be realized with the sinusoidal form of phase grating.

Figure 4A:
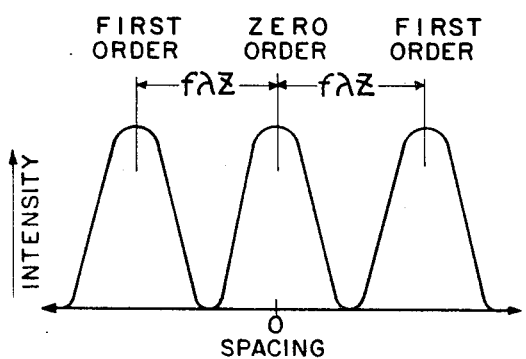
FIGS. 4a, 4b and 4c depict waveforms representing the intensity contours and relative image displacements present respectively in red, green and blue light wavelength regions.
Figure 4B:
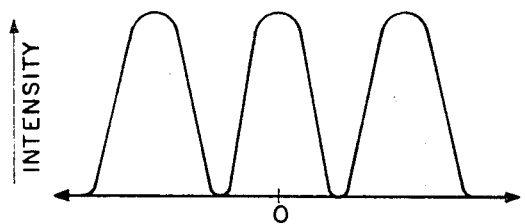
Figure 4C:
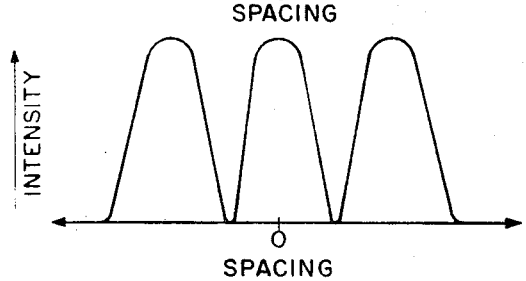

The order image intensity control available with the sinusoidal grating as described above is illustrated in connection with FIGS. 4a, 4b and 4c. Assuming a film screen is structured having components or stripes formed from the primaries red, green and blue, an intensity pattern at an image plane evidencing equal amplitudes of zero and first orders is available. For instance, zero and first order intensities of equal amplitude may be present in red region wavelengths as shown in FIG. 4a. Similarly, in FIG. 4b the relative intensity of each of the primary orders for wavelengths in the green region are shown adjusted to equality with the amplitude of the zero order. Further, in FIG. 4c it will be observed that the relative amplitudes of blue region first orders are equal in magnitude to that of the zero order. Additionally, it will be noted that image orders beyond a first order may be diminished to the point of insignificance by appropriate consideration of the above discussed design functions.

A considerable latitude is provided in mounting the sinusoidal gratings over a projector lens system inasmuch as a precise alignment of the grating and film screen stripes is not required. Generally, the gratings may be oriented within about 15° of that position considered theoretically perfect to provide an appropriate image blend. By altering the orientation of the grating, an advantageous tuning function may be introduced into the image blending system.

Figure 5:
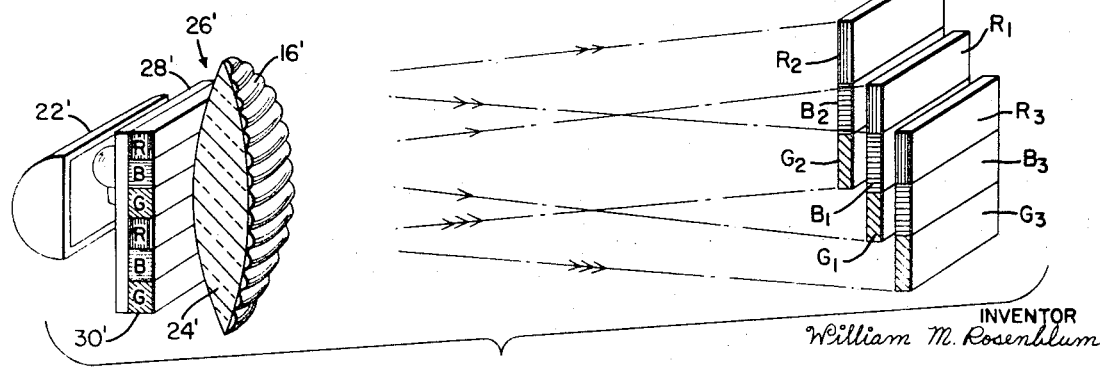
FIG. 5 is a schematic and partially sectional portrayal of a projection system according to the invention, showing an idealized projection of a scene through a transmission sinusoidal phase grating formed upon the surface of a projection lens.

To evolve an appropriate Fraunhofer form of diffraction, the gratings should be interposed within the projector optical path somewhere in the vicinity of the projection lens. Considerable latitude is available for this mounting. For instance, the grating structure may be deposited or appropriately formed upon the surface of the lens system of the projector. Alternately, the gratings may be installed within a simple bracket for facile insertion over the lens mounting structure of a projecter. Referring to FIG. 5, an arrangement wherein a grating structure is formed on the surface of the lens system of a projector is portrayed. The sinusoidal phase grating is pictured in exaggerated scale at 16' and is formed over the forward face or surface of a projection lens 24'. Lens 24' and grating 16' are positioned in the optical path of a projection system which includes a light source 22'. A fragment of color additive film is illustrated in greatly exaggerated scale at 26' in position to intercept light emanating from the light source. Film 26' is depicted having a simplified structure as earlier described including a combined image carrying layer and supportive base 28' over which is formed a screen 30'. Screen 30' is fashioned of parallel color stripes in the recurring sequence of primaries red, blue and green. The stripes are identified respectively by the letters R, B and G. Note the contoured sinusoidal surface of grating 16' is arranged in parallel with the lengthwise stripe orientation of the screen 30'. The phase grating 16' is configured having a select frequency $(f)$ representing the number of cross-sectional sinusoidal cycles per unit length disposed along its surface. This frequency is selected such that the grating will generate a Fraunhofer from of diffraction at an image plane, shown in expanded fashion for clarity, at 32'. As described in connection with FIG. 2, the Fraunhofer diffraction will form a zero order image at the center of the image plane 32' as dipicted by the three magnified image stripes $R_1$, $B_1$ and $G_1$. Single arrow lead lines schematically represent the projection of such a zero order image. The first orders of screen fragment image $R_1$ - $G_1$ - $B_1$ are depicted in the expanded image plane 32' by stripes $R_2$ - $G_2$ - $B_2$ within the double arrow lead lines and on the opposite side of the zero order image as stripes $R_3$ - $G_3$ - $B_3$ within the triple arrow lead lines. The primary order images are displaced from the zero order images by amounts sufficient to form a desirable blend or meld of the projected color components or stripes of the film structure. Grating 16' may be designed so as to cause primary order spacing adequate for causing the additive overlay of adjacent color stripes in like fashion as the plane grating at 16 describing connection with FIG. 2.

Further evidencing the desirably broad latitude of their use, a diffraction grating of a given frequency will be found acceptable for use over a relatively wide range of projection distances. The simplicity of their structure permits incorporation within a broad variety of projection devices.

Since certain changes may be made in the above discussed image blending arrangement without departing from the scope of the invention herein involved, it is intended that all matter contained in the above description or shown in the accompanying drawings shall be interpreted as illustrative and not in a limiting sense.

I claim:

1. Apparatus for projecting a scene recorded upon image carrier as an array of regularly spaced serially repetitive color components of selected wavelengths, $\lambda$, comprising:

means including an optical objective for projecting said recorded scene through an optical path having an axis Z and providing a magnified image thereof at an image plane at which $x$ and $y$ axes may be defined; and grating means interposed within and normal to said optical path closely adjacent said optical objective and configured for interposing a medium having a length $l$ height $l'$ and sinusoidally varying optical thickness, said grating means being spaced from said image plane a distance $z$, said medium being formed to cause a Fraunhofer form of diffraction of the image projected therethrough and derive zero and first order images, $q$, of each said color component having a respective intensity pattern at said image plane representable by the expression:

$$I(x,y) = ``\Sigma" : \left[\frac{ll'}{z}\right]^2 \cdot \sum_{q=-\infty}^{\infty} J_q^2\left(\frac{m}{2}\right)$$
$$\sin c^2\left[\frac{l}{\lambda z}(x-qf\lambda z)\right] \sin c^2\left(\frac{l'Y}{z}\right)$$

where $J_q$ is a Bessel function of the first kind of order, $q$, $f$ is the frequency of said sinusoidal variation and $m$ is the maximum range alteration of the phase of light progressing through said medium, the values for frequency, $f$, and the maximum range alteration, $m$, being selected to substantially equalize the peak intensity of any said image order, $q$, and said frequency, $f$, and distance, $z$, being selected to mutually space said zero and first order images at said image plane such that any color component of one said order image is superposed with at least one separate color component of another order image, whereby geometric patterns otherwise encountered during projection of said array of color component are caused to blend additively.

2. The apparatus of claim 1 wherein said grating means is a fully transmissive phase grating.

3. The apparatus of claim 1 in which said grating means is a fully transmissive phase grating having a frequency, $f$, selected for causing said order image spacing such that any said color component image at said image plane has superposed upon it the image of an adjacent color component.

4. The apparatus of claim 1 in which said grating means is formed upon an optical surface of said optical objective lens system.

5. The apparatus of claim 1 wherein said maximum range alteration, $m$, is selected having a value of about 140°.

6. The apparatus of claim 1 in which said grating means orientation with respect to said optical path is selectively variable by rotation about said $z$ axis so as to provide for selective tuning of said magnified image.

* * * * *